G. W. EDDY.
Car-Wheel.
No. 199,627. Patented Jan. 29, 1878.
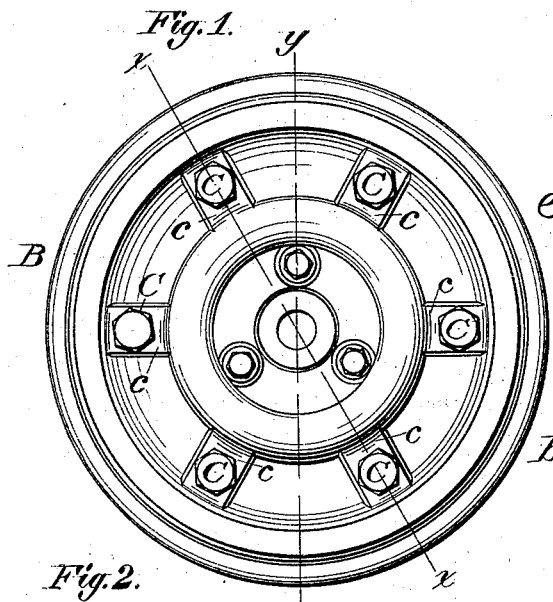
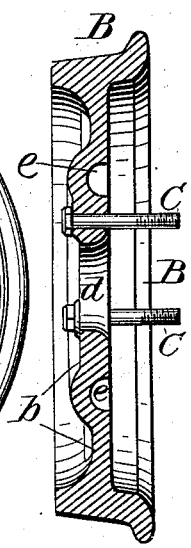
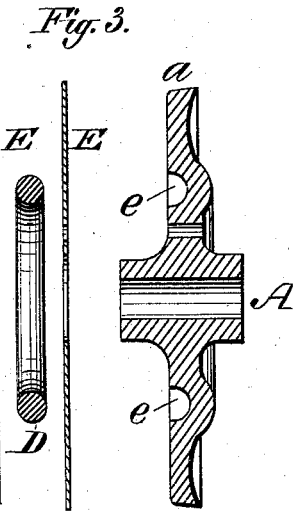
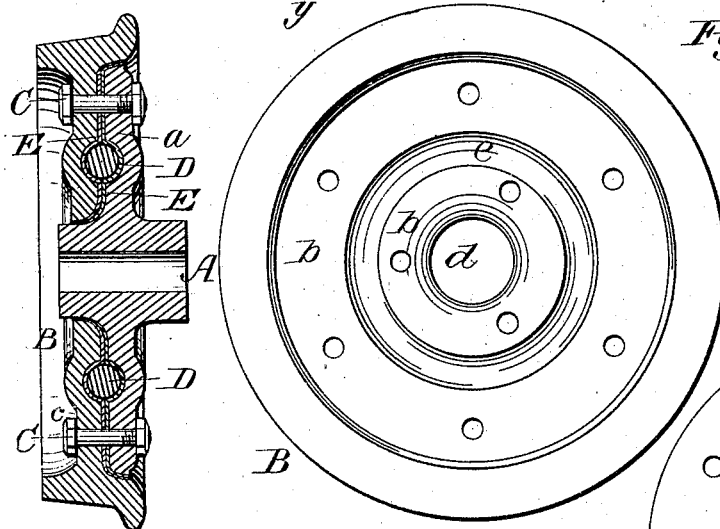
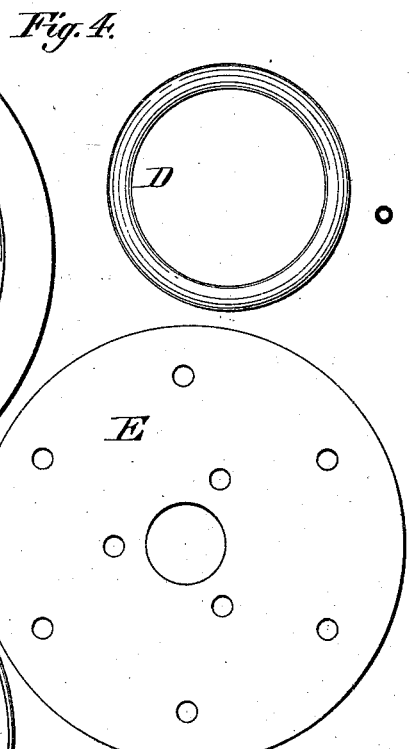
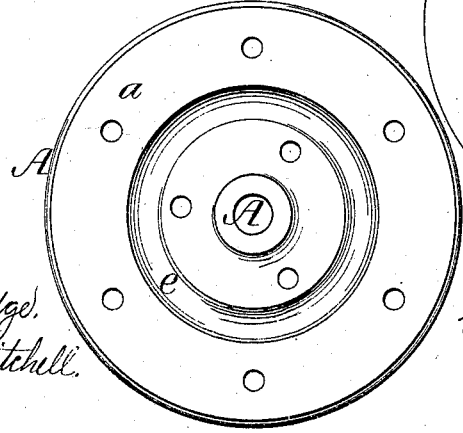
Witnesses:
Will N. Dodge
Donn I. Twitchell
Inventor:
G. W. Eddy
By Dodge & Son
attys.

UNITED STATES PATENT OFFICE.

GEORGE W. EDDY, OF WATERFORD, NEW YORK.

IMPROVEMENT IN CAR-WHEELS.

Specification forming part of Letters Patent No. 199,627, dated January 29, 1878; application filed November 8, 1877.

*To all whom it may concern:*

Be it known that I, GEORGE W. EDDY, of Waterford, in the county of Saratoga and State of New York, have invented certain Improvements in Car-Wheels, of which the following is a specification:

The object of my invention is to produce a compound car-wheel which will run with less noise than the usual solid wheels, prevent the transmission of the usual violent and solid vibrations to the axle, admit of the tread being replaced without the removal of the hub from the axle, and be less liable to breakage and less dangerous when broken than wheels of the ordinary construction.

With these ends in view the invention consists in constructing the tread and hub separately with webs or disks, to be bolted together face to face, said disks being grooved in their adjacent faces to receive a ring, which, together with sheets of packing material, is introduced between them.

The essential features of the invention are the use of the ring seated in and holding the two parts, and the intermediate packing covering the inner vertical faces of the webs or disks.

In constructing my wheel, I prefer to give the parts the form shown in the drawings, and to secure the two main parts together by bolts; but the precise shape of the parts is immaterial, and rivets or other fastening devices may be substituted in place of the bolts.

Figure 1 represents an outside face view of my improved wheel; Fig. 2, a vertical central section of the same; Fig. 3, a sectional view, showing the parts of the wheel separated from each other; Fig. 4, face views of the several parts.

A represents the central portion of the wheel, consisting of a solid hub, to be secured rigidly to the car-axle, provided with a radial disk, web, or flange, $a$, which may be of greater or less diameter, but which is preferably made of such size that its outer edge will nearly touch the inside of the rim or flange of the wheel. B represents the outside portion of the wheel, consisting of a flanged rim or tread of the ordinary form, provided with an inside disk or web, $b$, which has at its center an opening, $d$, to receive the end of the hub.

The two parts A and B are adapted to fit together in the manner represented in Figs. 1 and 2, with the disks or webs $a$ $b$ face to face, and with the outer end of the hub extending into or through the opening $d$.

The parts A and B are provided on the outer faces of their webs with bosses $c$, and have holes made through them to receive bolts C, by means of which and nuts on their ends the two parts are fastened together.

In the inner faces of the respective disks or webs $a$ $b$, I form two annular concentric grooves, $e$ $e$, directly opposite each other, as clearly shown, and in these grooves, at the time of putting the wheel together, I seat a strong metal ring, D, made of such form as to enter and fill the grooves in both disks. Before introducing the ring, however, I provide circular sheets E, of cloth, paper, or similar material of a yielding nature, of a diameter about equal to that of the disk $a$, and place one or more of these sheets each side of the ring D, so that upon drawing the parts together the packing will be confined between the faces of the disks or webs, and also forced down by the ring into the annular grooves in such manner as to completely surround the ring, as shown in Fig. 2.

It is preferred to make the ring of a round form in cross-section, and the grooves of corresponding form; but it may be made of an elliptical, diamond, or rectangular form, if preferred, the grooves being of course modified to correspond.

The packing may be of cloth, paper, leather, rubber, or other suitable material, and all except the last named may be treated with oil, paint, or other material to render it more durable.

It is preferred to have the outer edge of the packing extended tightly between the periphery of the disk $a$ and the inside of the rim of the wheel, as shown, in order that the disk may assist in supporting said rim; and it is also considered desirable to extend the packing at the center closely between the hub and the inner edge of the disk or web $b$, in order to give the latter a direct support on the hub; but the packing may be omitted at either or both of the points mentioned.

In order to secure the best results, the parts should be so proportioned that in drawing the parts together the ring will be seated with a considerable degree of firmness before the packing is compressed between the faces of the disks.

When the packing and the ring are inserted, and the parts all drawn firmly together, a very strong and solid wheel is presented.

The ring, which will be made of steel, wrought-iron, malleable iron, or other metal having great tensile strength and not liable to be broken, prevents the disks from shifting edgewise, and relieves the bolts from lateral strain; and in the event of either the hub or the rim being fractured, the ring will retain the parts in position and prevent the wheel from breaking down.

It will be observed that while the ring holds the two main parts in their proper relative positions, the introduction of the packing permits a slight yielding and giving of the parts—a movement so small as not to be perceptible to the eye, but at the same time sufficient to relieve the parts from the violent and destructive strains and shocks which occur when, as usual, there is a continuous metal connection between the rail and axle. By preventing the shocks the wear of the wheel, rails, axle, and attendant parts is greatly reduced.

The packing also serves to muffle and deaden the sound produced by the action of the wheels on the rails, and prevent its transmission to the axle, the consequence of which is, that the car will run with much less noise than the usual solid wheels.

As the rim and hub are in separate parts, the usual dangerous strain resulting from the shrinkage of the hub is avoided, the expensive annealing operation, and the consequent softening of the chilled tread avoided. The strain from shrinkage is also further avoided by the rounding out of the disks to form the grooves, the form thus given being that best adapted to permit the ready adjustment of the molecules as the disks cool after being cast.

The disks, instead of being flat, may be waved or corrugated, in the ordinary manner, as an additional precaution against strain from shrinkage.

Having thus described my invention, what I claim is—

1. The combination, in a car-wheel, of the hub and rim portions A and B, provided with grooves in their adjacent faces, a ring, D, and one or more packing-sheets on each side of said ring.

2. The combination, in a car-wheel, of a hub, A, having a grooved web, $a$, a tread, B, having a grooved web or plate, $b$, and an intermediate metal ring, D, seated in and between the two webs, as shown.

GEO. W. EDDY.

Witnesses:
WILL W. DODGE,
P. T. DODGE.